G M. GORDEN.
LEVER LOCK.
APPLICATION FILED MAR. 15, 1920.
1,388,035.
Patented Aug. 16, 1921.
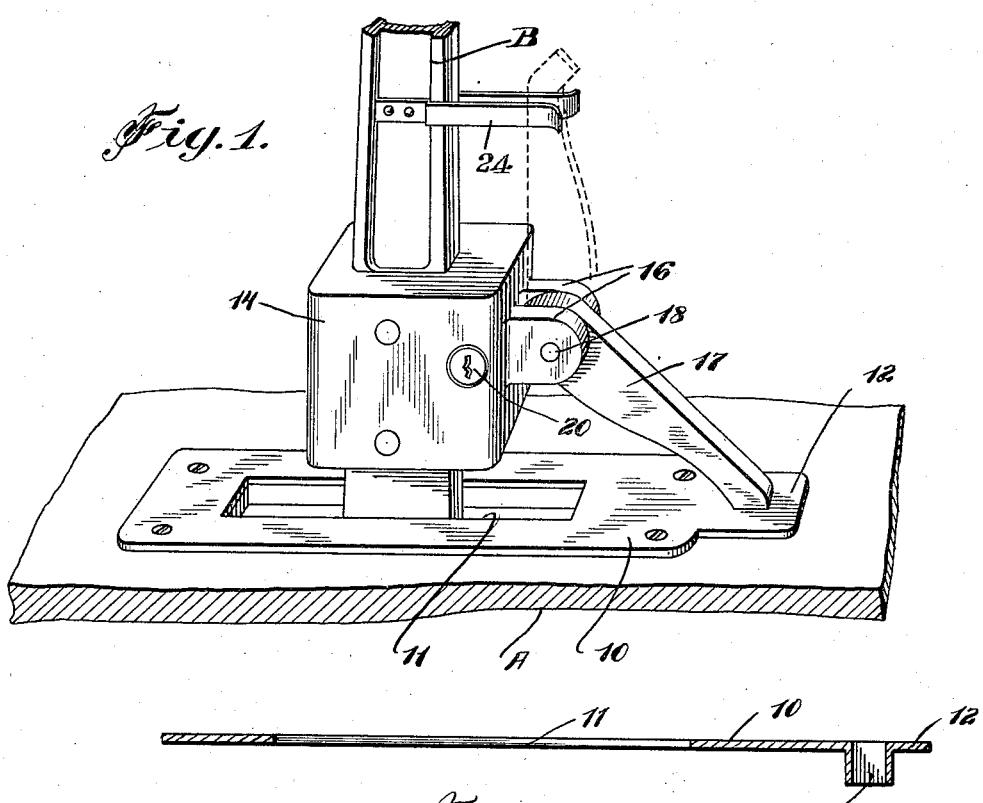
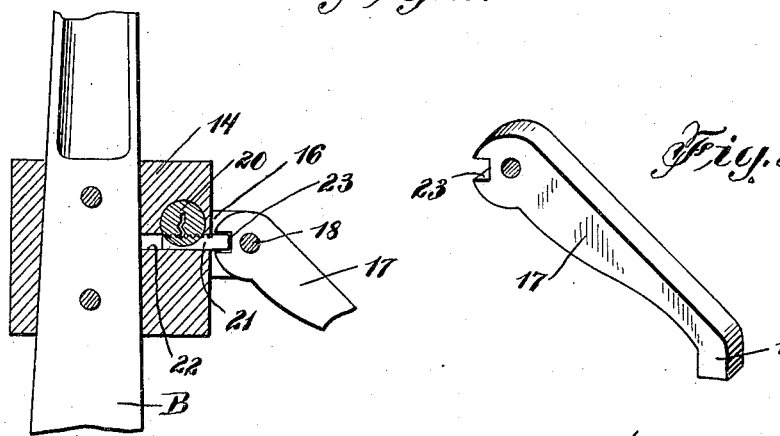
Inventor
G Murl Gorden
By Geo. Kimmel
Attorney

UNITED STATES PATENT OFFICE.

G MURL GORDEN, OF PORTLAND, OREGON, ASSIGNOR TO H. BLANCHE ADAMS, OF PORTLAND, OREGON.

LEVER-LOCK.

1,388,035.  Specification of Letters Patent.  Patented Aug. 16, 1921.

Application filed March 15, 1920. Serial No. 365,986.

*To all whom it may concern:*

Be it known that I, G MURL GORDEN, a citizen of the United States, residing at Portland, in the county of Multnomah and State of Oregon, have invented certain new and useful Improvements in Lever-Locks, of which the following is a specification.

The invention relates to a locking device for use in automobiles, and more particularly to the class of gear shift lever lock.

The primary object of the invention is the provision of a device of this character, wherein the construction thereof permits the mounting of the same upon the gear shifting lever in an automobile, so that when said lever is in neutral position the same can be locked rigid, thereby avoiding any possibility of the malicious tampering with the automobile or the theft of the same, as the gear shifting lever cannot be operated for changing the gears of the transmission, and in this manner stalling any attempt to start the automobile, as it is impossible to operate the latter when the gear shifting lever is held against movement.

Another object of the invention is the provision of a lock of this character, wherein the same is of novel form so that it can be mounted upon the gear shifting lever in an automobile and can be operated to latch the said lever to prevent freedom thereof for the usual manipulation of the same to control the transmission gears in the ordinary shifting thereof in operating the automobile and also the said lock can be released for the manuiplation of the gear shifting lever as usual.

A further object of the invention is the provision of a lock of this character, which is extremely simple in construction, possessing but few parts, readily and easily operated, convenient for immediate use, thoroughly reliable and efficient in its purpose, strong, durable and inexpensive to manufacture and install.

With these and other objects in view, the invention consists in the features of construction, combination and arrangement of parts, as will be hereinafter fully described, illustrated in the accompanying drawings and pointed out in the claims hereunto appended.

In the accompanying drawings:

Figure 1 is a fragmentary perspective view showing a portion of the floor board in the body of an automobile through which works the gear shifting lever, a portion of said lever and the lock constructed in accordance with the invention applied, the latch arm of the lock being in locking position as shown by full lines and in unlocked position as shown by dotted lines.

Fig. 2 is a perspective view of the escutcheon plate for the slot through which the gear operating lever works in the floor board of an automobile.

Fig. 3 is a perspective view of the latching arm of the lock.

Fig. 4 is a vertical sectional view through the gear shifting lever collar of the lock showing the latch bolt of the lock mechanism in engaging position with the latching arm of said device.

Similar reference characters indicate corresponding parts throughout the several views in the drawings.

Referring to the drawings in detail, A designates generally a portion of the floor board of the body of an automobile and B a portion of the gear shifting lever for controlling the transmission mechanism, the said lever being operated in the usual well known manner and works through a suitable slot formed in the floor board A. Mounted upon the floor board A about the slot therein for the shift lever B is a face or escutcheon plate, preferably in the form of a rectangular shaped frame 10, the open center 11 thereof alining with or in registration with the slot in the floor board A and working through this open center is the shift lever which is manually manipulated by the operator of the automobile in the usual well known manner. The frame 10 is fastened upon the floor board A in any suitable manner and has formed at one end thereof an extension 12 in which is provided a keeper socket 13 for coöperation with the lock hereinafter fully described.

The lock comprises a sleeve or collar 14 adapted to accommodate therein the shift lever B the sleeve or collar being adapted to embrace said shift lever and is placed thereon by slipping the same over the free end of the lever to be positioned at the desired point thereof. The sleeve or collar 14 is made fast upon the shift lever B through the medium of rivets or other permanent fastening means which are engaged transversely in one side of the sleeve or collar and in the shift lever so that the collar or sleeve 14 will be made fast thereon to avoid the easy removal thereof from the same.

On the sleeve or collar 14 exteriorly thereof are spaced parallel ears 16 between which is swingingly supported a latching pawl or arm 17, the same being supported upon a pivot 18 mounted transversely thereof and engaged in the ears 16. The pawl or arm 17 at its free end is formed with a latching terminal 19 adapted to be received in the keeper socket 13 in the frame 10

Mounted in the collar or sleeve 14 is a suitable key operated locking mechanism 20, which may be of any approved type and its bolt or tumbler 21 is adapted to be moved on the insertion and manipulation of the key for the locking mechanism therein, one side of the collar or sleeve 14 being provided with a slot 22 for the engaging of the bolt in a notch 23 formed in the pivoted end of the pawl or arm 17 so that the latter will be held fast when the latch terminal 19 thereof is engaged in the keeper socket 13 and in this manner the shift lever B will be held to prevent manipulation thereof, it being preferable to have the said lever B when locked in neutral position, yet the said lever can be shifted to any other position if found desirable as it would be only necessary to lengthen or shorten the pawl or arm 17 for the proper engagement of the latching terminal 19 thereof with the keeper socket 13 in the frame 10 formed by the face plate.

Carried by the shift lever B above the collar or sleeve is a clip 24, having a pair of resilient jaws adapted to receive therebetween the dog, pawl or arm 17 when swung upwardly to inoperative position, so that said dog, pawl or arm 17 will be held inactive to permit the free movement of the shift lever B for controlling the transmission mechanism of the automobile in the usual well known manner.

It is of course understood that the sleeve or collar 14 has a cutaway portion or slot 22 at the proper point to permit the bolt or tumbler 21 of the locking mechanism 20 to move into engagement with the notch 23 in the arm, pawl or dog 17 when the said locking mechanism 20 is actuated by a key therefor to fasten the said pawl, dog or arm against free movement to lock the shift lever B as will be clearly obvious.

When the shift lever B is locked by the pawl, dog or arm 17 the latter is engaged in the keeper socket 13 as is clearly shown in Fig. 1 of the drawings by full lines and when this pawl, dog or arm 17 is released it is moved to the position shown by dotted lines in Fig. 1 of the drawings.

It will be impossible to move the shift lever B when the same is held by the arm, pawl or dog 17 when engaged in the kepeer socket 13 in the frame 10 which is fast to the floor board A in the body of the automobile.

From the foregoing it is thought that the construction and manner of operation of the device will be clearly understood and therefore a more extended explanation has been omitted.

What is claimed is:

1. A locking device comprising a collar adapted to be securely fastened to a shift lever and having spaced parallel ears at one side, a latching member between and pivoted to the ears and having a notch in its pivoted end, a lock tumbler slidable between the ears and engageable in the notch to make fast the latching member when in latching position, and key actuated locking mechanism for controlling the tumbler.

2. A locking device comprising a collar adapted to be securely fastened to a shift lever and having spaced parallel ears at one side, a latching member between and pivoted to the ears and having a notch in its pivoted end, a lock tumbler slidable between the ears and engageable in the notch to make fast the latching member when in latching position, key actuated locking mechanism for controlling the tumbler, and a flat keeper adapted to lie against a floor board and be permanently fixed about the shift lever and having a socket for receiving the free end of the latching member to hold the lever against movement.

In testimony whereof I affix my signature hereto.

G MURL GORDEN.